Figure 1:
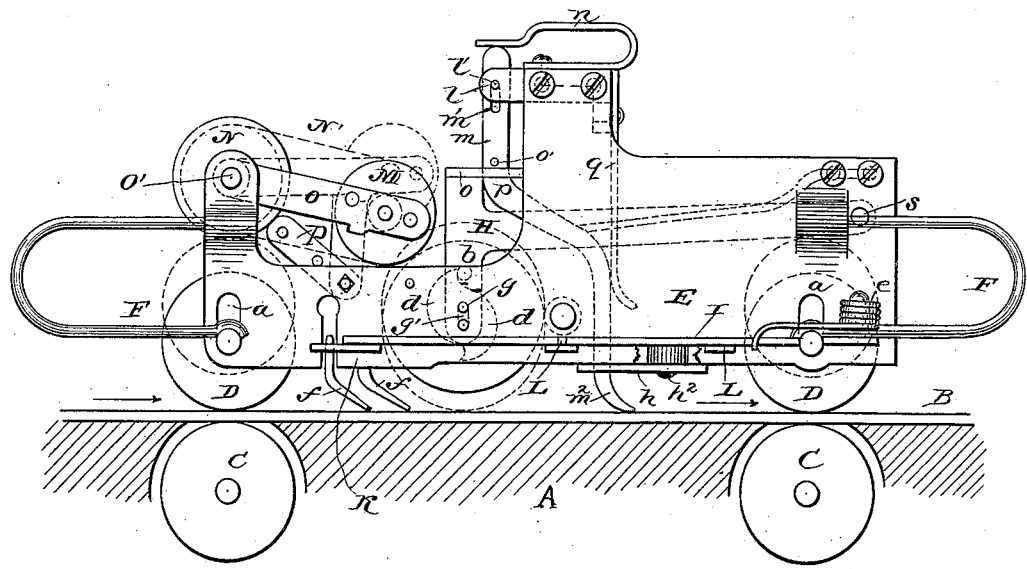

(No Model.) 4 Sheets—Sheet 1.
E. LAASS & G. W. HEY.
MAIL STAMPING APPARATUS.

No. 356,228. Patented Jan. 18, 1887.

Witnesses.
H. W. Elmore
Fred N. Fischer.

By their Attorneys,
Duell, Laass & Hey

Inventors
Emil Laass,
George W. Hey (No Model.) 4 Sheets—Sheet 2.
E. LAASS & G. W. HEY.
MAIL STAMPING APPARATUS.
No. 356,228. Patented Jan. 18, 1887.
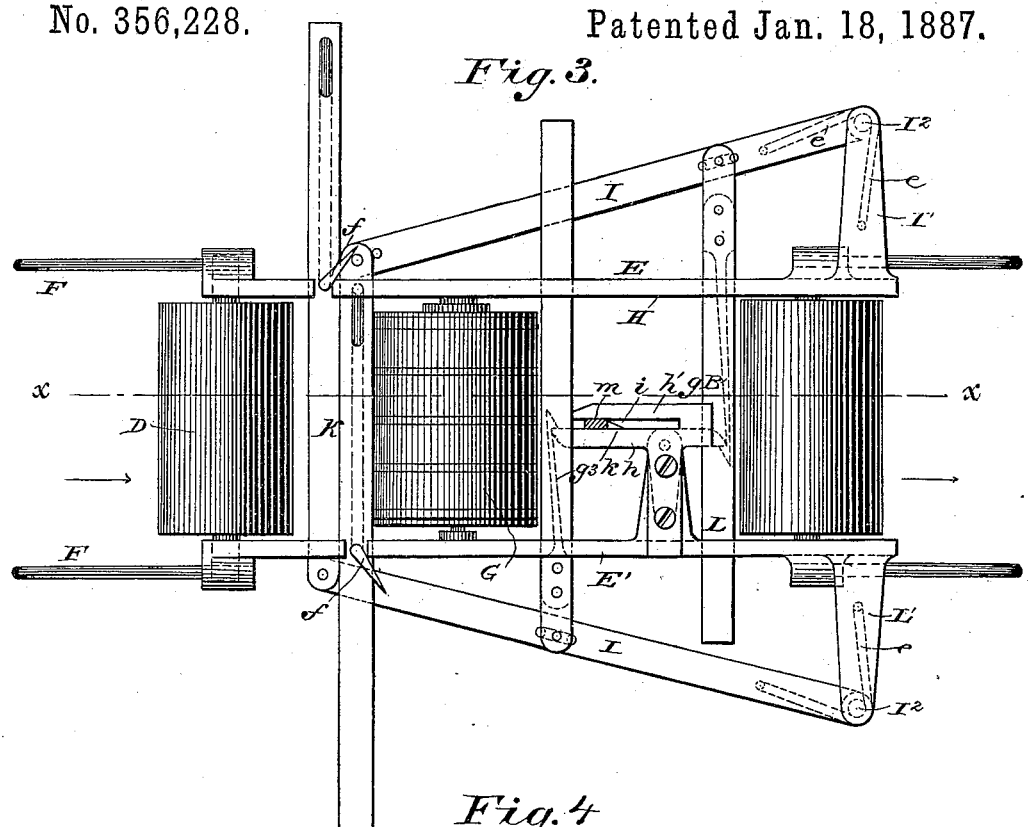
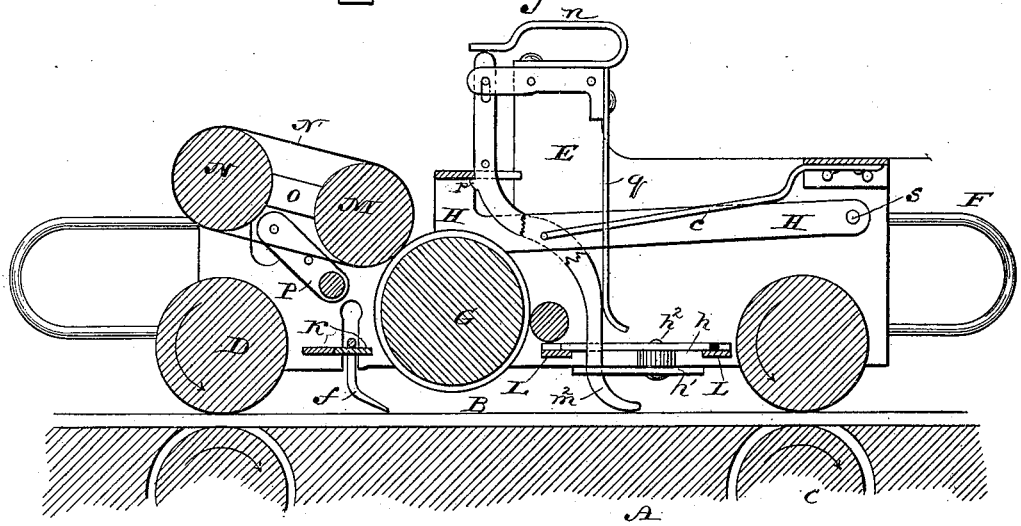
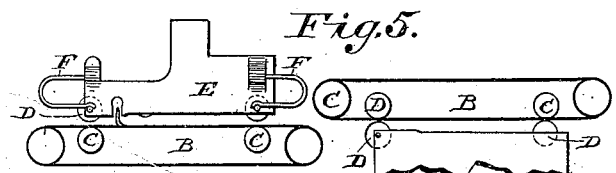
Witnesses.
H. W. Elmore
Fred V. Fischer
By their Attorneys,
Duell, Laass & Hey
Inventors
Emil Laass
George W. Hey
N. PETERS, Photo-Lithographer, Washington, D. C.

(No Model.) 4 Sheets—Sheet 3.
E. LAASS & G. W. HEY.
MAIL STAMPING APPARATUS.

No. 356,228. Patented Jan. 18, 1887.

Witnesses.
H. W. Elmore
Fred N. Fischer

Inventors.
Emil Laass
George W. Hey
By their Attorneys,
Dwell, Laass & Hey (No Model.)  4 Sheets—Sheet 4.

E. LAASS & G. W. HEY.
MAIL STAMPING APPARATUS.

No. 356,228. Patented Jan. 18, 1887.

Witnesses.
H. W. Elmore
Fred V. Fischer

By their Attorneys,
Duell, Laass & Hey

Inventors
Emil Laass,
George W. Hey

N. PETERS, Photo-Lithographer, Washington, D. C.

UNITED STATES PATENT OFFICE.

EMIL LAASS AND GEORGE W. HEY, OF SYRACUSE, N. Y., ASSIGNORS TO THE INTERNATIONAL POSTAL SUPPLY COMPANY OF NEW YORK.

MAIL-STAMPING APPARATUS.

SPECIFICATION forming part of Letters Patent No. 356,228, dated January 18, 1887.

Application filed December 17, 1885. Serial No. 185,973. (No model.)

*To all whom it may concern:*

Be it known that we, EMIL LAASS and GEORGE W. HEY, of Syracuse, in the county of Onondaga, in the State of New York, have invented new and useful Improvements in Mail-Stamping Apparatus, of which the following, taken in connection with the accompanying drawings, is a full, clear, and exact description.

Our invention relates to improvements in stamping apparatus of the character set forth and fully described in our application for Letters Patent filed February 26, 1884, and has for its object the production of an apparatus with which letters and mail-matter generally may be automatically stamped while the said letters or mail-matter are in transit on a letter-supporting bed, over which the aforesaid mail-matter is moved without prearrangement.

This apparatus is more particularly designed for impressing what is technically known as the "back-stamp" or "received mark," and since such mark, under the postal ordinances, must be applied to the back of the letter, the desideratum is to design and construct the mechanism so that the stamp will be controlled to operate only upon the desired sides of the letters.

To this end, then, our invention consists in an automatic mail-stamping machine having a temporarily-restrained stamp and a tripping device, a support for the letter constituting a back or abutment against which the stamp may act, and a selecting device or devices connected to the stamp-tripper, and of such form or shape as to readily engage with the sealed flaps of the letter-envelopes while the latter are moving over the supporting-bed, and by such engagement bringing the stamp into operation, and thereby impressing the back-stamp upon the proper face of the letter—*i. e.*, the back of the envelope.

It furthermore consists in arranging relatively to the supporting-bed the stamp or marker normally out of the path of movement of the letters, and in arranging the stamp tripper or releaser to oppose normally in the path of movement the selecting device, so as to encounter or engage the passing letter, and thereby throw into operation the stamp mechanism automatically.

It consists, also, in providing a selecting device or devices which mechanically feel the surfaces of the passing letters and select the backs of the envelopes by engaging the sealed flaps or projecting surfaces thereof. These mechanical fingers or feelers, by means of suitable connecting mechanism, serve to bring into action the stamp when engaged with the moving letter, as previously stated.

It furthermore consists in arranging upon the letter supporting bed duplicate stamping mechanism of the character mentioned, arranged reversely in relation to each other, so that a letter moved over the supporting-bed exposes alternately its opposite sides to the action of the machine, and the back-stamp is thereby impressed upon the back of the letter-envelope without prearrangement; and it also consists in the detail construction, arrangement, and combination of the parts, all as hereinafter fully described, and pointed out in the claims.

In specifying our invention we desire it to be understood that we consider the same to consist, broadly, in an automatic stamping apparatus for applying a mail-stamp through the medium of selecting devices which engage the overlapping flaps or sealed projections on the envelopes. We therefore do not limit ourselves to any specific form of mechanism or detail of construction of the stamp for carrying out the invention, as it is obvious that many modifications of such mechanism are permissible and readily apparent to the skilled mechanician without departing from the principle of our invention.

In the example of our invention illustrated, which we shall now describe, we have selected a convenient and compact arrangement for the desired purpose, in the drawings of which—

Figure 2:
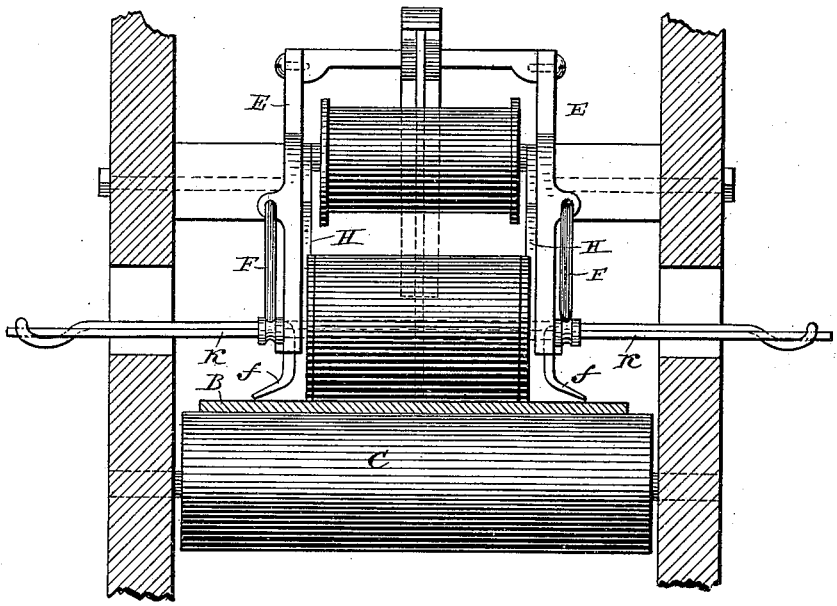

Figure 1 is a top plan view, the carrier-belt being arranged with its transverse plane vertical. Fig. 2 is an end view looking toward the feed end or in the direction of the travel of the carrier. Fig. 3 is a side elevation looking from the carrier. Fig. 4 is a horizontal section, with some of the parts in elevation, the section-line being marked X X, of Fig. 3.

Figure 6:
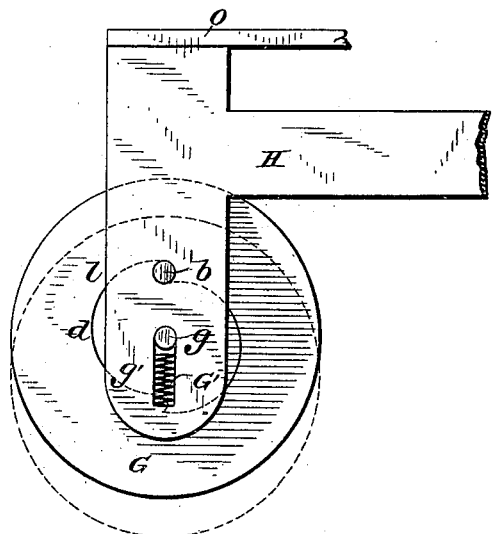
Figure 7:
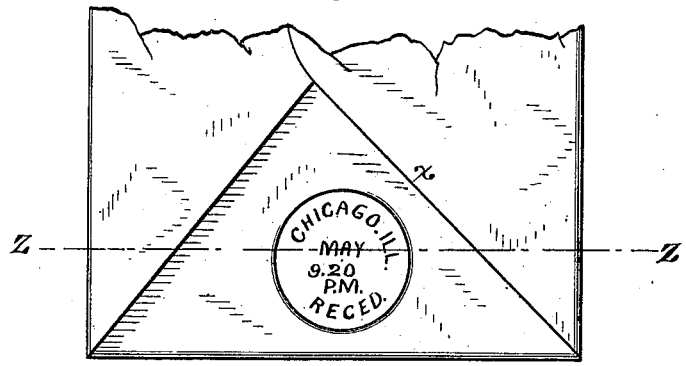
Figure 8:
Figure 9:
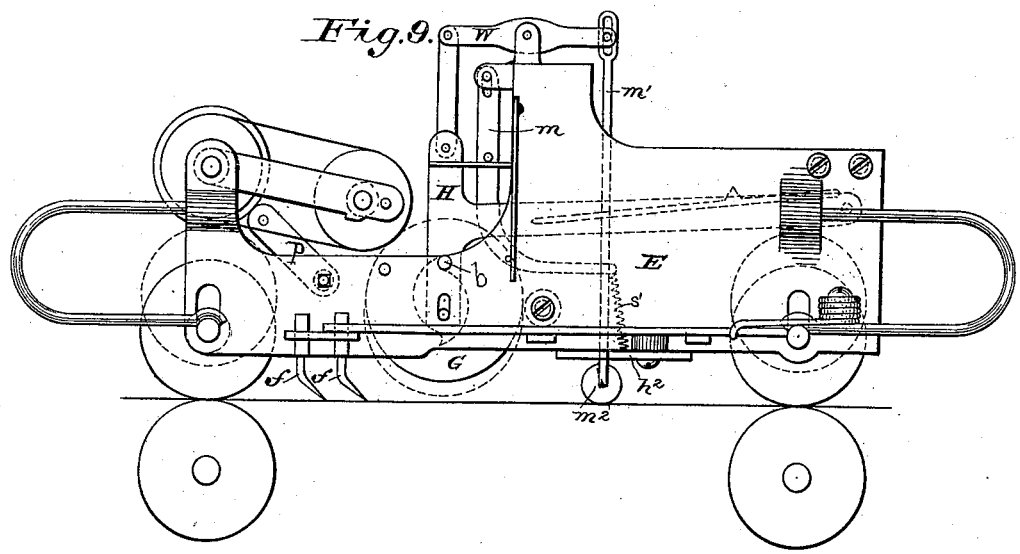
Figure 10:
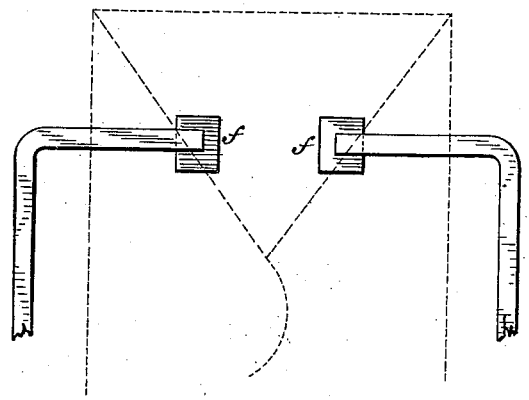
Figure 11:
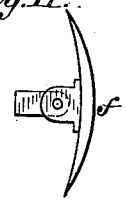
Figure 12:
Figure 13:
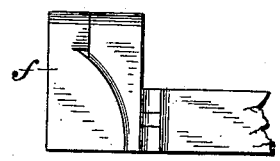

Fig. 5 is a plan, on a reduced scale, illustrating the arrangement of duplicate sets of the stamping mechanism placed reversely in relation to each other, so that letters may be treated without prearrangement. Fig. 6 is an enlarged detail of the stamping-roller and its adjacent parts. Fig. 7 is a plan view of a portion of an envelope. Fig. 8 is a section on the line z z of Fig. 7. Fig. 9 is a plan view of the marking or stamping apparatus, illustrating modifications of the mechanism for transmitting motion from the selecting devices to the marking or stamping mechanism. Fig. 10 is a plan view of a modification of the selecting devices. Figs. 11 and 12 are, respectively, enlarged side and end views of the same, and Fig. 13 is an inverted plan view thereof.

Referring to the drawings, in which similar letters of reference indicate like parts in all the figures, the letter A represents a bed for supporting the letter to be stamped or marked. Upon this bed the stamping apparatus is mounted, and the bed constitutes a back or abutment against which the stamp acts.

In this exemplification of our invention we employ a carrier, B, consisting of an endless belt running over rollers C C. This carrier serves, in connection with suitable feeding mechanism, which it is unnecessary to describe here, to carry the letters to the stamps on the letter-supporting bed.

The stamping apparatus consists of a main frame, E, which carries the essential operating elements of the invention. The frame E is secured on the supporting-bed A in any suitable manner so as to retain its relative position to the bed and carrier, substantially as shown, and to the end that it may accommodate the different-sized letters which pass the stamping mechanism on the supporting-bed the frame is provided with slots $a\ a$, in which the journals of the rollers D have sufficient play for the purpose.

It will be observed that the rollers D D in the frame E come opposite to and in contact with the rollers C C of the carrier B, the endless belt simply intervening. This arrangement secures the letter from crumpling or turning up as it runs past the marking apparatus. The stamp or marker consists of a roller, G, provided on its periphery with marking-dies mounted opposite each other. Upon the ends of the roller G knurled disks, projecting slightly beyond the periphery of the roller, are secured. These projecting disks constitute flanges which guide the marking-dies on the roller-stamp, so that when the roller is disposed on the moving letter the plane on the face of the marking-type is parallel and similar to that of the surface of the moving letter, and therefore an even impression is secured.

Upon the disk of the roller G are secured cams $d$, shaped as shown in Figs. 1, 6, and 9, with reverse side curves intersecting and terminating in pointed ends, the widest portion of the side curves of the cams coming next to that portion of the periphery of the roller on which the marking-die is placed, the pointed ends standing, respectively, up and down when the marking-roller is in its normal position out of the path of movement of the letters, as shown by the full lines in Fig. 1. The roller G, with its disks and cams $d$, is journaled in the oscillating frame H. The frame H is yoke-shaped, having slotted side arms, into which the journal of the roller G has a free vertical movement sufficient for the purpose, which will be presently described, and said frame H is pivoted in the main frame E so as to oscillate freely on its pivot. Over the roller G a cap, $o$, serves to connect the side arms of the frame H, and sustains, also, the releasing-catch, which temporarily restrains the stamping-roller normally out of the path of movement of the letters on the supporting-bed. Pins $b$ are secured in the side arms of the frame H in position to rest against the upper extremity of the cams $d$ when the roller G is at rest. In the slot $g'$ of the frame H, through which protrudes the journal $g$ of the roller G, we place a spring, G', upon which the journal $g$ bears. When the roller G turns upon its journal $g$, the pin $b$ rides up the curved side of the cam $d$, while the roller-journal $g$ is depressed on the spring in the slot $g'$ until the pin $b$ drops off at the lower extremity of the cam $d$, thus releasing pressure on the axle $g$, when the roller G is forced up by the spring G' to its normal position out of the path of movement of the letter on the supporting-bed.

The object of the vertical movement of the roller G, heretofore mentioned, is to permit the roller to be retracted from contact with the letter after the desired mark has been impressed thereon, and this retraction is effected by the arrangement of the cam on the roller-disk, the slotted support in the frame H, pin $b$, and the spring-cushion. It is to be observed that at the time the pin $b$ drops off of the cam $d$ at its lower extremity the position of said cam $d$ is reversed—i. e., it is in readiness immediately to again depress the roller by the contact of the pin $b$ with the reversed curve of the opposite side of the cam. In other words, while the roller G always moves in one direction, the printing-dies, mounted opposite to each other, are successively brought into action by a half-revolution of the roller G, controlled by the reversely-curved cam $d$ and the engaging-pin $b$ in the frame H. As has been explained, the printing-stamp G is sustained in its yoke H so as to be normally without the path of movement of the letters as they are moved over the supporting-bed. The object of so arranging the roller is to prevent the same from coming in contact with and marking the passing letters excepting when the right side of the letter is presented, when the stamp-roller is brought into contact with the letter by instrumentalities which, together with the restraining mechanism, will now be described.

The roller-yoke H is pivoted in the main frame E at *s*, so as to allow a free oscillation on its pivot. The cap *o* of the yoke is recessed horizontally, and a curved lever, *m*, its outer extremity being rectilinear and slotted at *m'*, is provided with a catch or notch, *p*. This lever *m* is secured adjustably in a recessed seat, *l*, in the outer part of the main frame E, where a free inward thrust is permitted by the movement of the pin *l'* in the slot *m'*. The straight portion of the lever *m*, beyond the notch *p*, sits loosely within the recess in the cap-plate *o* of the yoke H, and the curved portion of the lever *m*, terminating in the end *m²*, projects inward in close proximity to the letter-supporting bed. A spring, *n*, secured on the frame E, its free end bearing against the slotted end of the lever *m*, serves to hold the lever *m* yieldingly toward the supporting bed, while a pin, *o'*, inserted transversely through the lever *m*, rests against the cap-plate *o* of the yoke H. A spring, *q*, secured at one end to the frame E, bears with its other end against the curved back of the lever *m*, and serves to retain the catch *p* in engagement with the cap-plate *o* of the yoke H. This yieldingly-supported lever *m*, by its catch *p*, serves to temporarily restrain the roller-stamp G in its normal position while at rest, and the said roller is brought into its operative position automatically by the action of the selecting device or devices, which engage with the sealed flaps of the letter-envelopes and transmit motion to the stamp-tripper. The selecting devices consist of mechanical fingers or feelers, and are designated by *f*. They may be of any desired shape. The only requisite is, that they be shaped to engage readily with the overlapping edges or sealed flaps of the letter-envelopes, as clearly shown in Figs. 7 and 10.

As illustrated in Fig. 1, the selecting devices consist of curved feelers *f*, yieldingly attached to sliding bars K, and projecting rearwardly in close proximity to the letter-bed and its superposed carrier. Through the medium of the pivoted connections I, with the bars K, carrying the selecting devices, and bars L, carrying tripping devices, motion is transmitted from the selecting device to the lever *m*, and the roller-stamp is released. The end *m²* of the lever *m* passes through a slot, *i*, in the trigger-plate *h'*, said trigger-plate being mounted vertically in the frame E upon a projection, in position to permit the end *m²* of the lever *m* to pass through the slot *i* and move freely therein. A trigger, *h*, is pivoted by the pin *h²* on the projection to which the plate *h'* is secured, and is provided with a catch, *k*, which lies across the slot *i* in contact with the lever *m*. Both ends of the trigger *h* are shaped to engage, respectively, reversely-arranged spring-hooks supported on the sliding bars L L, which are carried on the pivoted bars I I, the object being to operate the trigger *h* by sliding either of the bars K K, with its selecting device, toward the center of the machine, and this is accomplished by the described construction and by securing a small spring on the trigger *h* to retain it normally in position with its shoulder *k* lying across the slot *i*.

It will be apparent that if either selecting device be moved toward the center of the machine, the pivoted bar I, to which the spring-hook is connected on the cross-slide L, will move the trigger *h*, thereby withdrawing its shoulder *k* from its position across the slot *i*, and such movement of the trigger disengages temporarily the spring-hook on the slide L, which is at rest, and the spring on the trigger forces the same into engagement again when the said trigger is released from the actuating spring-hook.

It is to be observed that when the selecting devices or either of them engage with the envelopes, as described, the bar or bars K slide with the movement of the selecting device toward the center of the machine, carrying with it the pivoted bar I, to which it is connected, and the bar L, with its spring-hook, thus causing the trigger to oscillate on its pivot, and withdrawing the shoulder *k* from its contact with the lever *m* in the slot *i*. When this takes place, the advancing letter comes in contact with the end *m²* of said lever and carries it along in the slot *i*. This movement of the lever *m* withdraws the catch *p* from its engagement with the cap-plate *o* of the roller-yoke H, and the roller-yoke H, by means of springs *c*, secured in the frame E, is forced toward the letter-bed until the stamp G comes in contact with the advancing letter. The stamp G immediately partakes of the movement of the letter and revolves upon its journal *g*. The cam *d* and pin *b* in the yoke H are now brought into action and serve the twofold office of depressing the roller in the slot *g'* while the printing-die is making its impression, which they do by the pin *b* riding up on the surface of the cam *d*, as previously described, until the pin drops off of the cam, when the roller G immediately resumes its normal position out of the path of the moving letter. It is to be understood that the spring G' retracts the roller G, as hereinbefore described.

While the pin *b* is riding up the cam *d* the roller-yoke H is being lifted, by reason of the movement of the cam against said pin *b*. This movement of the roller-yoke is utilized to reset the stamp-restraining mechanism, which it accomplishes in the following manner: In the first place, the lever *m* is lifted away from the supporting-bed by the movement of the yoke H, by reason of the pin *o'* coming in contact with the recessed plate *o*. This movement of the lever *m* restores it to its normal position, when the pressure of the spring *q*, which is exerted against its curved back, causes the catch *p* to engage the catch in the recessed plate *o*. Immediately when the lever *m* resumes its normal position, the trigger *h* is impelled by its spring to fly back on its pivot until the shoulder *k* rests against and locks the lever *m* into its position. As has been stated, the spring *n* serves simply as a cushion to yieldingly support the outer or slotted end of the lever *m*, and the tension of the back spring, q, must be so regulated that it will force the catch p readily into engagement with the cap-plate o. A vertical movement or thrust of the lever m is allowed by the slot m' and the spring n, and such movement or thrust permits the said lever m to yield away from the advancing letter and allow the latter to pass when the lever m reaches the end of the slot in the trigger-plate h'. The springs c are connected to the roller-yoke H, so as to force the yoke toward the letter-supporting bed.

In order to supply ink to the printing-die we provide a suitable frame, O, pivoted in an extension in the frame E, with inking-rollers of the usual form, as N M, covered with suitable absorbing-pads for distributing the ink; or an inking-ribbon, N', may be used in said frame O. To apply ink freely an auxiliary frame, P, pivoted beneath the frame O, is provided to hold the roller N off of the printing-roller G while ink is being applied to the inking device.

In the herein-illustrated example of our invention we have described the marking mechanism as arranged with its transverse plane in a vertical position; but it will be understood that this is immaterial, and other arrangements may be made.

The overlapping or sealed edges of the envelopes form inclined projecting edges, usually upon the back face, as seen in Figs. 7, 8, and 10, which projections are designated by letter x. When the envelopes have edges like those illustrated in Figs. 7 and 10, the selecting devices f, which, as already stated, mechanically feel the surfaces of the passing letter-envelopes, will engage both edges of the flaps of the envelopes. In envelopes having other shaped edges, like those of "official" envelopes, in which the incline of one edge is long and gradual and the other edge is abrupt, but one selecting device may engage. Therefore it is desirable that the selecting devices shall be so attached to the connecting mechanism which transmits motion to and releases the stamp that said selecting devices may act independently of each other in effecting the desired end; and the construction herein illustrated and described permits the independent action of the selecting devices as well as their combined action when treating an envelope of the kind illustrated.

In specifying our invention thus far we have provided simply for the marking of the letters when exposed to the action of the selecting devices with their backs thereto. If, now, the face of the envelopes were presented to the action of the selecting devices, no marking would take place, and consequently, if but one marking mechanism is employed, it will be necessary to turn the letter-envelopes in one position—i. e., with their backs toward the stamp or marker. In order to obviate the prearrangement of the letters in this respect, we arrange on the letter-supporting bed a duplicate stamping mechanism of the kind described hereinbefore, with its stamp and selecting devices standing opposite or reversely to those devices in the first mechanism. This arrangement is readily permitted by constructing the letter-supporting bed after the plan illustrated and described in our application of February 26, 1884, such letter-bed having reversely-arranged projections extending from the base, forming letter-bearing beds. This arrangement of the duplicate sets of stamping mechanism and the supporting-bed will be readily understood upon referring to Fig. 5 of the drawings, which shows a plan, on a reduced scale, of the desired arrangement. A carrier must be provided for the second set of marking mechanism, and arranged to be driven in the same manner, and the two sets of mechanism should be in such close proximity to each other that when a letter issues from the first it is immediately taken by the carrier of the second and forced past the stamp of the second mechanism, after which it is carried by the carrier out upon a conveying-belt or a table, as may be found desirable.

The feeding mechanism employed for operating the carrier or carriers may consist of any suitable device or devices, and forms no part of the invention herein described; hence specific description is omitted.

When the two sets of stamping mechanism are employed, since both sides—i. e., the back and front of the letter-envelope—are successively subjected to the action of the mechanical fingers or feelers which constitute the selecting devices, it is apparent that were not the marking-stamp temporarily restrained and out of the path of the moving letter, said letter would be marked continuously upon both sides; but at the same time, in order to bring the stamp into operation by the engagement of the passing letter with the selecting device, it is essential that the selecting device must be normally opposed in the path of the advancing letter, so as to collide therewith and engage the overlapping edges, as stated, and the selecting devices must be so arranged as to yield freely vertically, to allow the letters to pass readily thereunder in their transit over the supporting-bed. To secure this end, the selecting devices are mounted on springs, as illustrated in the drawings, and as previously described.

To adapt the rollers D to different-sized letters, their journals are sustained in the slots a of the frame E by U-shaped springs F F. The construction of the parts and the arrangement of the connecting mechanism for transmitting motion can be greatly modified and changed without departing from the principle of our invention—as, for example, the mechanical finger or fingers f, constituting the selecting devices, may be either of the form of pointers f, as represented in Fig. 1 of the drawings, or made in the form of shoes or slides having V-shaped edges adapted to run slightly under the edges of the sealed envelope-flaps, as illustrated in Figs. 10, 11, 12, and 13 of the drawings, in which latter case we prefer to hinge the feeler on its support so as to allow it to rock longitudinally, and thus mount more readily the overlapping edges of the approaching letter-envelope. So, also, the catch-lever *m* may be constructed and connected to the stamp-frame H, as shown in Fig. 9. In this case the catch-lever *m* is thrown out of engagement with the yoke-frame H by a supplemental lever passing through the free end of the lever *m* and operated by a trigger, *h*, similar to that already described. Said trigger being caused to release the supplemental lever by the movement of the pivoted levers I, incident to the engagement of the selecting devices *f f* with the edges of the envelope-flaps, the released lever drops upon the moving letter, and is thereby drawn along and thus caused to draw the catch-lever out of engagement with the frame H. The supplemental lever is raised from the letter automatically with the descent of the frame H and marking-roller G by the medium of a walking-beam, W, pivoted on the frame E, and connected at opposite ends, respectively, with the lever *m* and supplemental lever. A suitable spring, *s'*, crowds the supplemental lever toward the supporting-bed, and imparts to it the requisite pressure to obtain the necessary hold on the moving letter, while a small roller journaled on the frame E slightly in advance of the lever *m²* of the supplemental lever prevents the letter from crumpling as it advances to the end of the supplemental lever.

The operation of the invention will be readily understood from the description of the invention and of the functions of the various parts, and it is only necessary to call attention to the fact that the stamping mechanism is normally at rest in a set position, and that when the letter is presented the selecting devices mechanically feel its surfaces and engage the overlapping or sealed edges thereof. The movement of the letter while the selecting devices are engaged causes the selecting devices to move toward the center of the stamping apparatus, carrying with them the connections which transmit the motion of the selecting devices to the releasing-catch of the stamp-roller. The stamp-roller when released is forced by its depressing-springs onto the letter, and the onward advance of the letter revolves the roller-stamp, causing it to impress the requisite stamp on the letter, while the restraining mechanism is being raised in position to reset the roller-stamp by the contact of the pin *b* with the cam-surfaces *d* as the marking-roller revolves upon its journal in impressing or marking the passing letter. In other words, it will be observed that while the contact of the selecting device with the moving letter releases and brings into action the marking-stamp, the operation of impressing the stamp or mark upon the letter is utilized in the manner and with the described means to reset the stamp-roller and its restraining mechanism, so as to be in readiness to treat the succeeding letter.

Of course the letter passes through both mechanisms, and the operation accrues to that set with which the sealed edges of the letter and the selecting device or devices engage, and the letter is marked as stated.

Any suitable marking die or type may be used on the stamp, and any suitable ink or inking arrangement may be used to ink the same. We desire to call attention to the fact that in specifying the printing-roller and the slot *g'* in the frame H and the slot *m'* in the lever *m* the terms "depress the roller," "free vertical movement in the slot *g'*," and "free vertical thrust" in the slot *m'* have been employed in referring to the functions and operations of the recited parts. These expressions are to be understood to mean that the roller G is moved or forced toward the letter-supporting bed, and that its journal *g* moves freely toward and from the supporting-bed in the slot *g'*, and the lever *m'* has a free thrust or movement toward and from the letter-supporting bed in the slot *m'*, where the terms occur throughout the specification.

It will be observed that the marking-roller G, as has been previously stated herein, is so mounted in its oscillating frame or yoke as to be normally out of the path of movement of the letters, while the stamp tripper or releaser is normally in their path, and is so connected with the roller-yoke by intermediate mechanism as to be capable of controlling the action of the marking-roller by transmitting motion thereto when a letter collides with the stamp-tripper. This combination of devices, however, we do not claim, broadly, herein, as they form the subject-matter of a separate application for Letters Patent which was filed by us June 2, 1884, Serial No. 133,493.

Having thus fully described our invention, what we claim as new, and desire to secure by Letters Patent, is—

1. An automatic mail-stamping machine, comprising a temporarily-restrained stamp, a back or abutment against which the stamp acts, and a selecting device, such as described, to engage the edges of the flaps of the envelopes and to bring the stamp into operation, substantially as described, and for the purpose set forth.

2. In an automatic mail-stamping machine, in combination with the stamp or marker, a tripper for temporarily restraining said stamp or marker and mechanical fingers or feelers adapted to engage the edges of the flaps of the envelopes and to transmit motion to the stamp or marker, all combined and operating to automatically apply the stamp or marker to the mail-matter by the presentation of the letter to the front of the stamp, substantially as set forth.

3. In an envelope-marking machine wherein the marker is operated automatically by the envelope through intermediate mechanism, the combination, with the marker, of a yielding releasing finger or feeler and suitable connecting mechanism, substantially as described, and shaped to catch or engage with the overlapping edges of the envelope, whereby the marker will be released by the contact of said finger with the overlapping edges, as set forth.

4. In combination with a supporting-bed, A, with mechanism, substantially as described, for stamping letters, laterally-movable fingers or feelers and suitable connecting mechanism, substantially as described, for engaging with the overlapping edges of the envelopes to set the stamping mechanism automatically into operation, as set forth.

5. In combination with a stamping mechanism, substantially as described, held out of operation by a trigger, and with a carrier, substantially as described, catching fingers or feelers adapted to pass along the surface of the envelope being carried forward and engaging its projecting parts, and connected, substantially as described, with said trigger, whereby such engagement will trip said trigger to set the stamping mechanism into operation, substantially as described, and for the purpose set forth.

6. In combination with a carrier and a stamping mechanism, substantially as described, held at rest by a trigger, fingers or feelers adapted to engage the projecting parts of a letter-envelope, and connections, substantially as described, with said trigger, whereby the stamping mechanism may be set into operation automatically, and means, substantially as described, whereby the power of the carrier is controlled to throw the stamping mechanism out of operation and into engagement with the trigger for a subsequent similar operation, all substantially as described and set forth.

7. In a machine substantially as described, in combination with a stamping mechanism, substantially as described, and with a carrier, catching fingers or feelers yieldingly in contact with the letter and adapted to engage the overlapping edges of the envelope to automatically throw the stamping mechanism into operation, all substantially as described and set forth.

8. In combination with a stamping mechanism, substantially as described, and with a trigger for holding the said mechanism out of operation, duplicate fingers or feelers, as $f$, adapted to engage either or both the projections, as of an envelope, and connections, substantially as described, with either end of said trigger, as set forth.

9. In combination with a stamping mechanism, substantially as described, a trigger, $h$, the feelers $f$ and connections, substantially as described, for automatically tripping the trigger, and the cam $d$ and connections, substantially as described, for returning the stamping mechanism to the control of the trigger automatically, as set forth.

10. In combination with the frame H, trigger $h$, the roller G, and means, as described, for automatically throwing the frame into connection with and control of said trigger, the springs G', for throwing the roller G out of operation as soon as the trigger has control of the frame, as set forth.

11. In combination with the frame H, having cap $o$, and lever $m$, having catch $p$, the trigger $h$, having shoulder $k$, the tripping-connections, substantially as described, cam $d$, pin $b$, carrier, and spring, as set forth.

12. The feelers $f$, reversely-arranged slides K K and L L, levers I, springs $e\ e$, and spring-hook $g^3$, combined with a stamping mechanism, substantially as described, and the trigger, as and for the purpose set forth.

13. The frame H, having cap $o$, and springs $c$ and pin $b$, combined with the roller G, having cam $d$, the spring G', the trigger $h$, and connections, as set forth.

14. The frame H, having cap $o$ and pin $b$, the catch-lever $m$, having catch $p$ and pin $o'$, the trigger $h$, having the shoulder $k$, the roller G, and spring G', combined with the means, $f$, and connections, substantially as described, for tripping the trigger, and with the cam $d$, for returning the frame H to the control of the trigger, as set forth.

15. The combination, with a marking-roller and a movable frame supporting said roller, of cams and stud-pins connected, respectively, to said parts and in contact with each other to raise the frame automatically with the rotation of the roller, and springs bearing on the roller-journal to force the roller off from the marking-abutment when the frame is raised, as aforesaid, and a catch for engaging the frame, substantially as and for the purpose set forth.

16. In a mail-machine of the class herein described, the lever $m$, having its upper end slotted to allow free thrust on its seat in the frame of the machine, its lower end extending inward in close proximity to the carrier in position when released to collide with envelopes moved over the supporting-bed to withdraw the catch $p$ from engagement with the roller-frame H, in combination with the retracting-spring $q$, as described.

17. In the within-described marking-machine, the combination of the catch-finger or feeler, marking-roller G, and an inking device, as described, the said parts having suitable connections, as described, and operated in the manner and for the purpose set forth.

18. In combination, a marking-roller journaled in an oscillating frame, H, a pivoted frame, H, having slotted extensions, in which the marking-roller journal has a vertical movement, a pin or stud, $b$, secured on the frame H in position to ride on a cam, $d$, secured on the marking-roller, the said cam $d$, and a spring, as G', secured on the frame H and in contact with the roller-journal, all substantially as and for the purpose specified.

19. In an automatic mail-stamping machine, a selecting device or mechanical finger consisting of a runner-shaped shoe, $f$, having a sharp engaging edge and a guard-flange over said edge, substantially as and for the purpose described.

20. The within-described selecting device or mechanical finger, consisting of a runner-shaped shoe, *f*, pivoted to a movable support, and having a sharp engaging edge and guard-flange, substantially as and for the purpose set forth.

In testimony whereof we have hereunto signed our names, in the presence of two attesting witnesses, at Syracuse, in the county of Onondaga, in the State of New York, this 10th day of December, 1885.

EMIL LAASS. [L. S.]
    GEORGE W. HEY. [L. S.]

Witnesses:
 FREDERICK H. GIBBS,
 E. C. CANNON.